(12) United States Patent
Miura et al.

(10) Patent No.: US 6,933,698 B2
(45) Date of Patent: Aug. 23, 2005

(54) METHOD OF DRIVING A SERVO MOTOR WITH A BUILT-IN DRIVE CIRCUIT

(75) Inventors: Hiromasa Miura, Nagano-ken (JP); Toshiyuki Noda, Nagano-ken (JP)

(73) Assignee: Tamagawa Seiki Kabushiki Kaisha, Nagano-Ken (JP)

( * ) Notice: Subject to any disclaimer, the term of this patent is extended or adjusted under 35 U.S.C. 154(b) by 0 days.

(21) Appl. No.: 10/703,487

(22) Filed: Nov. 10, 2003

(65) Prior Publication Data

US 2004/0178761 A1 Sep. 16, 2004

(30) Foreign Application Priority Data

Mar. 6, 2003 (JP) ....................................... 2003-059563

(51) Int. Cl.[7] .............................................. G05B 11/32
(52) U.S. Cl. ....................... 318/625; 318/111; 318/112; 318/113; 318/560; 318/562; 318/569; 318/600
(58) Field of Search ................................ 318/560–625, 318/111–113, 700–800, 138, 254, 439

(56) References Cited

U.S. PATENT DOCUMENTS

| | | | | |
|---|---|---|---|---|
| 5,545,959 A | * | 8/1996 | Otsuki et al. | 318/568.15 |
| 5,581,254 A | * | 12/1996 | Rundel | 341/155 |
| 5,619,111 A | * | 4/1997 | Katagiri et al. | 318/625 |
| 5,739,648 A | * | 4/1998 | Ellis et al. | 318/112 |
| 5,742,143 A | * | 4/1998 | Katagiri | 318/625 |
| 5,912,541 A | * | 6/1999 | Bigler et al. | 318/600 |
| 6,188,190 B1 | * | 2/2001 | Arakawa | 318/560 |
| 6,188,194 B1 | * | 2/2001 | Watanabe et al. | 318/625 |
| 6,522,096 B1 | * | 2/2003 | Roth | 310/156.01 |
| 6,806,660 B2 | * | 10/2004 | Fujisaki et al. | 318/113 |
| 6,809,494 B1 | * | 10/2004 | Hattori et al. | 318/625 |

FOREIGN PATENT DOCUMENTS

JP 58-157389 * 9/1983 ............. H02P/7/28

* cited by examiner

*Primary Examiner*—David Martin
*Assistant Examiner*—Tyrone Smith
(74) *Attorney, Agent, or Firm*—Wenderoth, Lind & Ponack, L.L.P.

(57) ABSTRACT

Disclosed is a method of driving a servo motor with a built-in drive circuit in which a common rectifying circuit is provided on a distribution board to which a plurality of the servo motors with built-in drive circuits are connected, to thereby achieve a reduction in size of each servo motor. In this method, there is used a common distribution board for distributing power to be supplied to a plurality of servo motors with built-in drive circuits and for distributing a communication line, an external communication signal and external input power are supplied through the distribution board.

12 Claims, 2 Drawing Sheets

METHOD OF DRIVING A SERVO MOTOR WITH A BUILT-IN DRIVE CIRCUIT

BACKGROUND OF THE INVENTION

1. Field of the Invention

The present invention relates to a method of driving a servo motor with a built-in drive circuit. In particular, the present invention relates to a novel improvement of a servo motor for attaining a reduction in size, thereby facilitating additional installation of the servo motors. The reduction in size of the servo motor can be attained by using: a plurality of the servo motors each having a built-in drive circuit; and a distribution board for distributing DC power and a communication signal to be supplied to each of the servo motors, and by providing a rectifying circuit common to the respective motors to the distribution board.

2. Description of the Related Art

Hitherto, there is known a motor encoder using an encoder as a conventional servo motor of this type (see, for example, JP 62-278408 A).

In the above-mentioned motor encoder, a motor and an encoder are combined into an integral unit, which is servo-driven by an external drive signal.

The conventional servo motor is constructed as described above, and therefore has the following problems.

That is, the servo motor contains the encoder alone, and the driver system, (that is, the drive circuit) is provided outside the motor as a separate component. Accordingly, when a number of servo motors are used as a multi-axis system, as in the case of a machine tool or a robot, the space occupied by the respective drive circuits of the motors constitutes an obstruction, making it difficult to achieve a reduction in size. Apart from the above, there has also been proposed a construction in which-part of the drive circuits arranged inside the motor. However, a construction containing a rectifier for AC/DC conversion and a capacitor leads to an increase in overall size, which is incompatible with the demand for a reduction in size.

SUMMARY OF THE INVENTION

The present invention has been made with a view toward solving the above problems in the prior art. In particular, an object of the present invention is to provide a method of driving a servo motor with a built-in drive circuit, in which a plurality of drive circuit built-in type servo motors are used as the servo motors, and a distribution board for distributing DC power and a communication signal to be supplied to the respective servo motors is used, thereby a reduction in servo motor size is achieved and additional installation of the servo motors is facilitated.

According to the present invention, there is provided a method of driving a servo motor with a built-in drive circuit, including: using a plurality of the servo motors each including a built-in drive circuit; and a common distribution board for distributing DC power and a communication line to each of the servo motors; and distributing an external communication signal and external input power through the common distribution board to each of the servo motors with built-in drive circuits to supply the external communication signal and the external input power to each of the servo motors with built-in drive circuits. Further, the present invention relates to a method of driving a servo motor with a built-in drive circuit, further including: providing a rectifying circuit for converting the input power into the DC power to the distribution board; and connecting the DC power source and the communication line of the communication signal to each of the servo motors with built-in drive circuits from the distribution board through a single multi-core cable. Moreover, the present invention relates to a method of driving a servo motor with a built-in drive circuit, further including: providing a rectifier and a smoothing capacitor constituting the rectifying circuit to the distribution board; and obtaining each of the DC power to be supplied to each of the servo motors with built-in drive circuits by using the shared single rectifier and the shared single smoothing capacitor.

DETAILED DESCRIPTION OF THE PREFERRED EMBODIMENT

A preferred embodiment of a method of driving a servo motor with a built-in drive circuit according to the present invention is described hereinafter with reference to the drawings.

Figure 1:
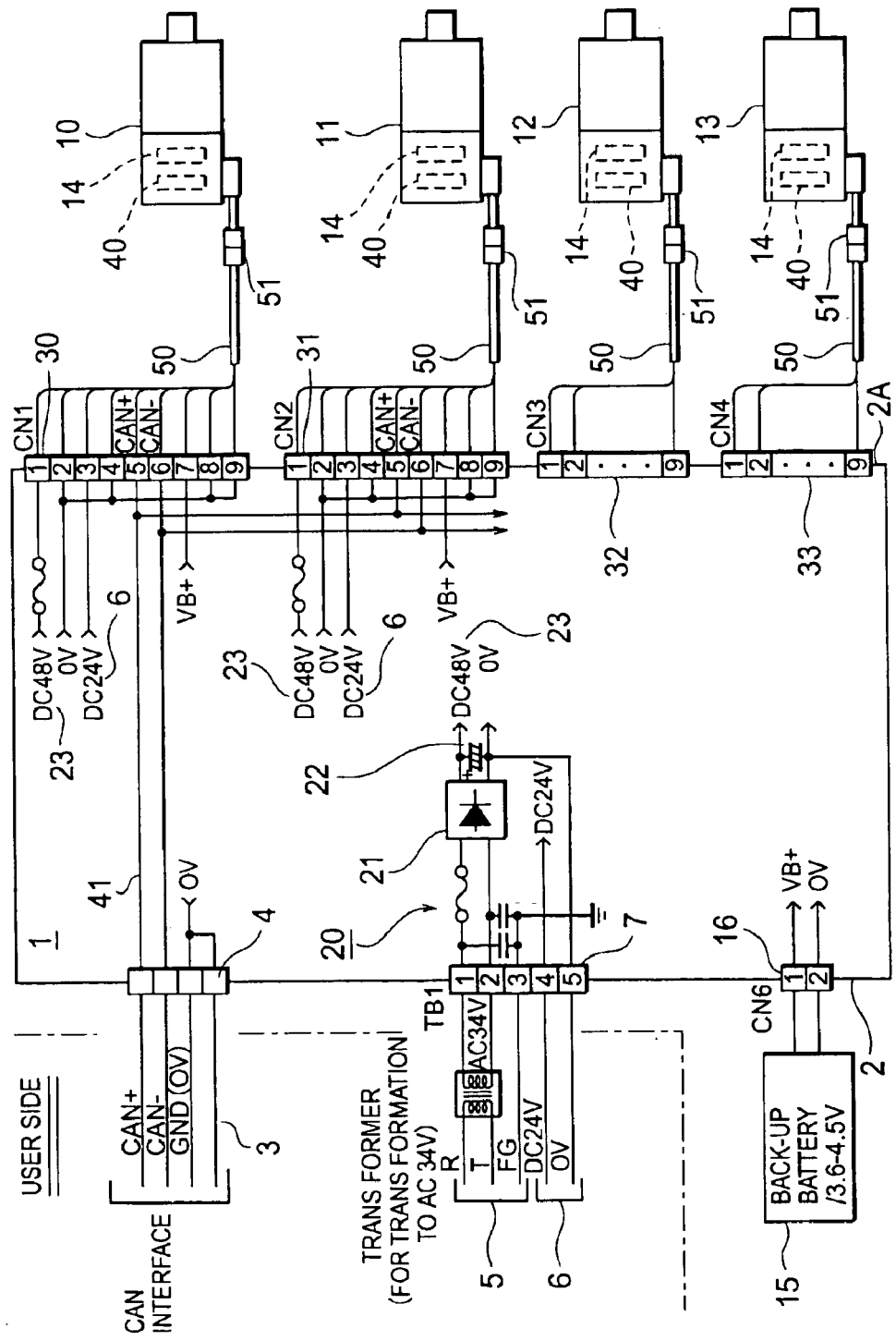
FIG. 1 is a schematic diagram illustrating a method of driving servo motors with built-in drive circuits according to the present invention.

In FIG. 1, reference numeral 1 indicates a distribution board. Connected to an input side 2 of the distribution board 1 are various signals from a user side, where servo motors with built-in drive circuits 10 through 13 described below are used in the plant.

On the input side 2 of the distribution board 1, there is provided a communication connector 4 for inputting communication signals 3 of the well-known CAN data system or the like to the servo motors 10–13 with built-in drive circuits 40.

At a position in the vicinity of the communication connector 4, there is provided a power source connector 7 for supplying power from an AC power source 5 serving as a main power source and a control power source 6 to the distribution board 1. At a position in the vicinity of the power source connector 7, there is provided a back-up connector 16 for the connection of a sensor back-up power source 15 for effecting back-up, at the time of a power failure or the like, of output signals from encoders 14, etc. in the servo motors 10–13 with built-in drive circuits 40. In other words, the power source connector 7 and the back-up connector 16, like the communication connector 4, are provided on the common distribution board 1, as illustrated in FIG. 1.

The power source connector 7 of the distribution board 1 is equipped with a rectifying circuit 20, which is provided on the distribution board 1.

Figure 2:
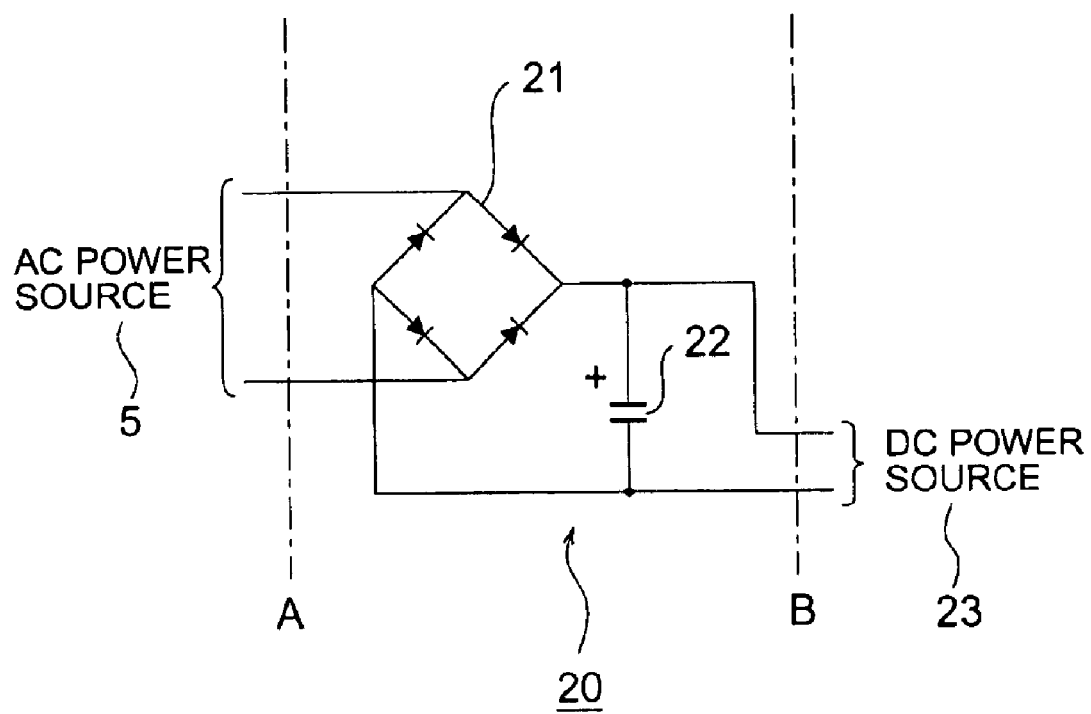
FIG. 2 is a circuit diagram showing a rectifying circuit of FIG. 1.

As shown in FIG. 2, the rectifying circuit 20 is composed of a rectifier 21 and a smoothing capacitor 22 connected to the rectifier 21. The voltage of the control power source 6 is DC 24 V, and the voltage of a DC power source 23, passed through the rectifying circuit 20, is DC 48 V.

On the output side 2A of the distribution board 1, a plurality of output connectors 30 through 33 are arranged in correspondence with the communication connector 4 and the power source connector 7. The output connectors 30 through 33 are respectively connected to the servo motors 10–13 with built-in drive circuits 40 through the intermediation of multi-core cables 50 composed, for example, of 8-core cables, and waterproof connectors 51.

Communication signals 3, such as command signals to be transmitted to drive circuits 40, which are the drivers of the servo motors 10–13 with built-in drive circuits 40, are input to the drive circuits 40 through communication lines 41 connecting the communication connector 4 to the output connectors 30 through 33.

One rectifying circuit 20 is shared by the servo motors with 10–13 with built-in drive circuits 40, and the power from the DC power source 23 is supplied to the servo motors 10–13 with built-in drive circuits 40 through the output connectors 30 through 33 and the multi-core cables 50.

The power from the control power source 6 is a DC power, so that it is supplied to the servo motors with built-in drive circuits 10 through 13 through the multi-core cables 50 without passing through the rectifying circuit 20.

Next, an operation of this embodiment will be described. In the above-described construction of FIG. 1, the various communication signals 3, the power from the DC power source 23, the power from the control power source 6, and the power from the sensor back-up power source 15 are supplied to the servo motors 10–13 with built-in drive circuits 40 through the distribution board 1. On the basis of the command signals among the communication signals 3, the servo motors 10–13 with built-in drive circuits 40 are driven with rotation control.

The method of driving the servo motor with the built-in drive circuit, described above, provides the following advantages.

When the plurality of servo motors with built-in drive circuits are to be driven, there is no need for each servo motor to contain the rectifier and the smoothing capacitor since the common rectifying circuit is mounted on the single distribution board shared by the servo motors, thus making it possible to achieve a reduction in sizes of the servo motors themselves.

Further, the connection between each servo motor and the distribution board can be effected solely through the single multi-core cable, whereby the wiring when using a number of servo motors is markedly facilitated.

What is claimed is:

1. A method of driving servo motors each having a built-in drive circuit, comprising:
    mounting a communication connector of a CAN data system onto a distribution board, the communication connector being connected to each of the servo motors via the distribution board;
    mounting a back-up connector of a back-up battery onto the distribution board, the back-up connector being connected to each of the servo motors via the distribution board;
    mounting a power source connector of an external input power supply onto the distribution board, the power source connector being connected to each of the servo motors via the distribution board;
    distributing an external communication signal to each of the servo motors via the communication connector and the distribution board; and
    distributing external input power to each of the servo motors via the power source connector and the distribution board.

2. The method of claim 1, further comprising:
    mounting a rectifying circuit onto the distribution board so that the rectifying circuit is operable to convert external AC input power into DC input power; and
    connecting each of the servo motors to the distribution board via only a single respective multi-core cable; and
    wherein said distributing of the external communication signal and said distributing of the external input power to each of the servo motors comprises distributing the external communication signal and the external input power from the distribution board to each of the servo motors via only the single multi-core cable of each of the servo motors.

3. The method of claim 2, wherein the rectifying circuit includes a rectifier and a smoothing capacitor; further comprising:
    converting the external AC input power into the DC input power using the rectifier and the smoothing capacitor; and
    distributing the DC input power from the rectifying circuit to each of the servo motors via the distribution board and the single multi-core cable of each of the servo motors.

4. The method of claim 2, further comprising:
    converting the external AC input power into the DC input power using the rectifying circuit; and
    distributing the DC input power from the rectifying circuit to each oil the servo motors via the distribution board and the single multi-core cable of each of the servo motors.

5. The method of claim 1, further comprising:
    mounting a rectifying circuit onto the distribution board so that the rectifying circuit is operable to convert external AC input power into DC input power, the rectifying circuit including a rectifier and a smoothing capacitor;
    converting external AC input power into DC input power using the rectifying circuit; and
    distributing the DC input power from the rectifying circuit to each of the servo motors via the distribution board.

6. The method of claim 1, further comprising distributing back-up battery power to each of the servo motors via the back-up connector and the distribution board.

7. The method of claim 1, further comprising mounting an output connector of each of the servo motors onto the distribution board.

8. The method of claim 7, further comprising:
    mounting a rectifying circuit onto the distribution board so that the rectifying circuit is operable to convert external AC input power into DC input power; and
    connecting each of the servo motors to the corresponding output connector on the distribution board via only a single respective multi-core cable; and
    wherein said distributing of the external communication signal and said distributing of the external input power to each of the servo motors comprises distributing the external communication signal and the external input power from the respective output connector of each of the servo motors to each of the servo motors via only the single multi-core cable of each of the servo motors.

9. The method of claim 8, wherein the rectifying circuit includes a rectifier and a smoothing capacitor; further comprising:
    converting the external AC input power into the DC input power using the rectifier and the smoothing capacitor; and
    distributing the DC input power from the rectifying circuit to the respective output connector of each of the servo motors via the distribution board, and from the respective output connector of each of the servo motors to each corresponding servo motor via the single multi-core cable of each of the servo motors.

10. The method of claim 8, further comprising:

converting the external AC input power into the DC input power using the rectifying circuit; and distributing the DC input power from the rectifying circuit to the respective output connector of each of the servo motors via the distribution board, and from the respective output connector of each of the servo motors to each corresponding servo motor via the single multi-core cable of each of the servo motors.

11. The method of claim 7, further comprising:

mounting a rectifying circuit onto the distribution board so that the rectifying circuit is operable to convert external AC input power into DC input power, the rectifying circuit including a rectifier and a smoothing capacitor;

converting external AC input power into DC input power using the rectifying circuit; and distributing the DC input power from the rectifying circuit to the respective output connector of each of the servo motors via the distribution board, and from the respective output connector of each of the servo motors to each corresponding servo motor.

12. The method of claim 7, further comprising distributing back-up battery power from the back-up connector to the respective output connector of each of the servo motors via the distribution board, and from the respective output connector of each the servo motors to each corresponding servo motor.

* * * * *